United States Patent
Rieder et al.

(10) Patent No.: US 6,851,323 B2
(45) Date of Patent: *Feb. 8, 2005

(54) VIBRATORY TRANSDUCER

(75) Inventors: Alfred Rieder, Landshut (DE); Wolfgang Drahm, Teltow (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/748,147

(22) Filed: Dec. 31, 2003

(65) Prior Publication Data

US 2004/0149047 A1 Aug. 5, 2004

Related U.S. Application Data

(63) Continuation of application No. 10/127,597, filed on Apr. 23, 2002, now Pat. No. 6,691,583.
(60) Provisional application No. 60/286,547, filed on Apr. 27, 2001.

(30) Foreign Application Priority Data

Apr. 24, 2001 (EP) .......................................... 01109977

(51) Int. Cl.$^7$ .................................................. G01F 1/84
(52) U.S. Cl. ............................................... 73/861.357
(58) Field of Search .................... 73/861.357, 861.356, 73/86.355

Primary Examiner—Harshad Patel
(74) Attorney, Agent, or Firm—Bacon & Thomas

(57) ABSTRACT

To conduct a fluid, the transducer has a flow tube which in use is vibrated by an excitation system and whose inlet-side and outlet-side vibrations are detected by means of a sensor system. In response to transverse forces produced in the vibrating flow tube, the latter is, at least temporarily, laterally displaced from an assigned static rest position. To improve the dynamic balance of the transducer, a first cantilever and a second cantilever are rigidly fixed to an inlet-side tube section and an outlet-side tube section, respectively. By means of the cantilevers, the inlet-side and outlet-side tube sections are deformed as a result of lateral displacements of the flow tube. This produces counterforces which at least partially counterbalance the transverse forces produced in the vibrating flow tube. One advantage of the proposed transducer is that it is well balanced even during variations in fluid density.

8 Claims, 3 Drawing Sheets

VIBRATORY TRANSDUCER

CROSS-REFERENCE TO RELATED APPLICATION

This application is a continuation of application Ser. No. 10/127,597, filed Apr. 23, 2002, now U.S. Pat. No. 6,691,583, which claims benefit of Provisional Appl. Ser. No. 60/286,547, filed Apr. 27, 2001.

FIELD OF THE INVENTION

This invention relates to a vibratory transducer which is particularly suited for use in a Coriolis mass flowmeter.

BACKGROUND OF THE INVENTION

To determine the mass flow rate of a fluid flowing in a pipe and particularly of a liquid, use is frequently made of measuring devices which induce Coriolis forces in the fluid and derive therefrom a measurement signal representative of mass flow rate by means of a vibratory transducer and of control and evaluation electronics connected thereto.

Such Coriolis mass flowmeters have been known and in industrial use for a long time. EP-A 317 340, U.S. Pat. Nos. 5,398,554, 5,476,013, 5,531,126, 5,691,485, 5,705,754, 5,796,012, 5,945,609, and 5,979,246 as well as WO-A 99/51946, WO-A 99/40349, and WO-A 00/14485, for example, disclose Coriolis mass flowmeters with a vibratory transducer which responds to the mass flow rate of a fluid flowing in a pipe and comprises:

- a single straight flow tube for conducting the fluid which vibrates in operation and communicates with the pipe via an inlet-side tube section and an outlet-side tube section;
- an excitation system which in operation excites the flow tube into flexural vibrations in one tube plane; and
- a sensor system for sensing inlet-side and outlet-side vibrations of the flow tube.

As is well known, straight flow tubes excited into flexural vibrations according to a first form of natural vibrations cause Coriolis forces in the fluid passing therethrough. These, in turn, result in higher-order and/or lower-order coplanar flexural vibrations according to a second form of natural vibrations being superimposed on the excited flexural vibrations, so that the vibrations sensed on the inlet and outlet sides by means of the sensor system exhibit a measurable phase difference, which is also dependent on mass flow rate.

Usually, the flow tubes of such transducers, which are used in Coriolis mass flowmeters, for example, are excited in operation at an instantaneous resonance frequency of the first form of natural vibrations, particularly with the vibration amplitude maintained constant. Since this resonance frequency is also dependent on the instantaneous density of the fluid in particular, commercially available Coriolis mass flowmeters can also be used to measure the density of moving fluids.

One advantage of straight flow tubes is that they can be drained residue-free with a high degree of reliability in virtually any position of installation and particularly after a cleaning operation performed in-line. Furthermore, such flow tubes are much easier and, consequently, less expensive to manufacture than, for example, an omega-shaped or helically bent flow tube. A further advantage of a straight flow tube vibrating in the above-described manner over bent flow tubes is that in operation, virtually no torsional vibrations are caused in the connected pipe via the flow tube.

A significant disadvantage of such transducers consists in the fact that as a result of alternating lateral deflections of the vibrating single flow tube, transverse forces oscillating at the same frequency can act on the pipe, and that so far it has been possible to counterbalance these transverse forces only in a very limited manner and with a very large amount of technical complexity.

To improve the dynamic balance of the transducer and particularly reduce such transverse forces produced by the vibrating single flow tube and acting on the pipe on the inlet and outlet sides, the transducers disclosed in EP-A 317 340, U.S. Pat. Nos. 5,398,554, 5,531,126, 5,691,485, 5,796,012, and 5,979,246 as well as WO-A 00/14485 each comprise at least one single-part or multipart "antivibrator" which is fixed to the flow tube on the inlet and outlet sides. In operation, such antivibrators, which are implemented in the form of beams and particularly of tubes or as a physical pendulum aligned with the flow tube, vibrate out of phase with, particularly opposite in phase to, the respective flow tube, whereby the effect of the lateral transverse forces exerted by the flow tube and the antivibrator on the pipe can be minimized or even neutralized.

Such transducers with antivibrators have proved particularly effective in applications where the fluid to be measured has a substantially constant or only very slightly varying density, i.e., in applications where a resultant of transverse forces produced by the flow tube and counterforces produced by the antivibrator, which resultant acts on the connected pipe, can be readily preset to zero.

If used for fluids with widely varying densities, such as different fluids to be measured in succession, such a transducer, particularly one as disclosed in U.S. Pat. Nos. 5,531,126 or 5,969,265, has practically the same disadvantage, even though to a lesser degree, as a transducer without antivibrator, since the aforementioned resultants are also dependent on the density of the fluid and thus may differ considerably from zero. In other words, in operation, even an overall system composed of flow tube and antivibrator will be nonlocally deflected from an assigned static rest position as a result of density-dependent unbalances and associated transverse forces.

One possibility of reducing the density-dependent transverse forces is proposed, for example, in U.S. Pat. No. 5,979,246, in WO-A 99/40394, or in WO-A 00/14485. WO-A 00/14485, in particular, discloses a vibratory transducer for a fluid flowing in a pipe, said transducer comprising:

- a flow tube vibrating in operation, for conducting the fluid, the flow tube communicating with the pipe via an inlet-side tube section and an outlet-side tube section, and the vibrating flow tube being, at least temporarily, laterally displaced from an assigned static rest position as a result of transverse forces produced therein, so that transverse impulses occur in the transducer;
- an excitation system for driving the flow tube;
- a sensor system for sensing vibrations of the flow tube; and
- a first antivibrator, fixed to the inlet-side tube section, and a second antivibrator, fixed to the outlet-side tube section, for producing compensating vibrations, the compensating vibrations being such that the transverse impulses are compensated, so that a centroid of a vibration system formed by the flow tube, the excitation system, the sensor system, and the two cantilevers is kept in the same position.

WO-A 99/40394 discloses a vibratory transducer for a fluid flowing in a pipe, said transducer comprising:

a flow tube vibrating in operation, for conducting the the fluid, the flow tube communicating with the pipe via an inlet-side tube section and an outlet-side tube section; and an antivibrator fixed to the flow tube on the inlet side and outlet side, with transverse forces being produced in the vibrating flow tube and in the antivibrator;

a transducer case fixed to the inlet-side tube section and the outlet-side tube section;

an excitation system for driving the flow tube;

a sensing system for sensing vibrations of the flow tube;

a first cantilever, fixed to the inlet-side tube section and to the transducer case, for producing counterforces counteracting the transverse forces on the inlet side; and a second cantilever, fixed to the outlet-side tube section and to the transducer case, for producing counterforces counteracting the transverse forces on the outlet side, the counterforces being such that the flow tube is held in an assigned static rest position despite the transverse forces produced.

In the aforementioned transducers, including those described in U.S. Pat. No. 5,979,246, the problem of density-dependent unbalances is solved in principle by adapting an amplitude variation of the antivibrator to the flow-tube vibrations in advance and/or in operation, particularly by making the spring constants of the antivibrator amplitude-dependent, such that the forces produced by the flow tube and the antivibrator neutralize each other.

Another possibility of reducing density-dependent transverse forces is described, for example, in U.S. Pat. Nos. 5,287,754, 5,705,754, or 5,796,010. In the transducers disclosed therein, the transverse forces produced by the vibrating single flow tube, which oscillate at medium or high frequencies, are kept away from the pipe by means of an antivibrator that is very heavy in comparison with the flow tube, and by coupling the flow tube to the pipe relatively loosely, i.e., practically by means of a mechanical low-pass filter. A big disadvantage of such a transducer is, however, that the antivibrator mass required to achieve sufficient damping increases disproportionately with the nominal diameter of the flow tube. Use of such massive components, on the one hand, entails both increased assembly costs during manufacture and increased costs during installation of the measuring device in the pipe. On the other hand, it must always be ensured that a minimum natural frequency of the transducer, which decreases with increasing mass, is still far from the likewise very low natural frequencies of the connected pipe. Thus, use of such a transducer in industrial Coriolis mass flowmeters or Coriolis mass flowmeter-densimeters and particularly in meters for measuring liquids is limited to relatively small nominal diameters less than or equal to 10 mm.

SUMMARY OF THE INVENTION

It is therefore an object of the invention to provide a transducer which is particularly suited for a Coriolis mass flowmeter or a Coriolis mass flowmeter-densimeter and which in operation, even if it uses only a single, particularly straight, flow tube, is dynamically well balanced over a wide fluid density range and nevertheless has comparatively little mass.

To attain this object, the invention provides a vibratory transducer for a fluid flowing in a pipe, said transducer comprising:

a flow tube vibrating in operation, for conducting the fluid, the flow tube communicating with the pipe via an inlet-side tube section and an outlet-side tube section, and the vibrating flow tube being, at least temporarily, laterally displaced from an assigned static rest position as a result of transverse impulses occurring in the transducer;

an excitation system for driving the flow tube;

a sensor system for sensing vibrations of the flow tube;

a first cantilever, fixed to the inlet-side tube section, for causing bending moments that elastically deform the inlet-side tube section; and a second cantilever, fixed to the outlet-side tube section, for causing bending moments that elastically deform the outlet-side tube section, the bending moments being such that in the deforming inlet-side tube section and in the deforming outlet-side tube section, impulses are produced which are directed opposite to the transverse impulses produced in the vibrating flow tube.

Furthermore, the invention provides a vibratory transducer for a fluid flowing in a pipe, said transducer comprising:

a flow tube vibrating operation, for conducting the fluid, the flow tube communicating with the pipe via an inlet-side tube section and an outlet-side tube section, and the vibrating flow tube being, at least temporarily, laterally displaced from an assigned rest position as a result of transverse forces produced in the flow tube;

an excitation system for driving the flow tube;

a sensor system for sensing vibrations of the flow tube;

a first cantilever for causing bending moments that elastically deform the inlet-side tube section, said first cantilever having a cantilever arm rigidly fixed to the inlet-side tube section and a cantilever mass formed thereon;

a second cantilever for causing bending moments that elastically deform the outlet-side tube section, said second cantilever having a cantilever arm rigidly fixed to the outlet-side tube section and a cantilever mass formed thereon, both the cantilever mass of the first cantilever and the cantilever mass of the second cantilever being spaced from the flow tube, from the inlet-side tube section, and from the outlet-side tube section, and the cantilever arm and cantilever mass of the first cantilever and the cantilever arm and cantilever mass of the second cantilever being so adapted to one another that a centroid of the first cantilever, located in the area of the inlet-side tube section, and a centroid of the second cantilever, located in the area of the outlet-side tube section, remain essentially in a static rest position although the flow tube is laterally displaced from its assigned static rest position.

In a first preferred embodiment of the invention, the deforming inlet-side tube section and the deforming outlet-side tube section bend essentially in a direction opposite to that of the lateral displacement of the flow tube.

In a second preferred embodiment of the invention, the flow tube is substantially straight.

In a third preferred embodiment of the invention, the vibrating flow tube performs flexural vibrations.

In a fourth preferred embodiment of the invention, each of the two cantilevers is at least as heavy as the flow tube.

In a fifth preferred embodiment of the invention, the transducer comprises an antivibrator fixed to the flow tube on the inlet and outlet sides.

In a sixth preferred embodiment of the invention, the antivibrator is tubular in form.

In a seventh preferred embodiment of the invention, the flow tube at least partly is enclosed by the antivibrator.

In an eighth preferred embodiment of the invention, the flow tube and the antivibrator are coaxial.

In a ninth preferred embodiment of the invention, discrete mass pieces are fixed to the antivibrator.

In a tenth preferred embodiment of the invention, grooves are formed in the antivibrator.

In an eleventh preferred embodiment of the invention, the mass pieces fixed to the antivibrator are annular in shape and coaxial with the antivibrator.

A fundamental idea of the invention is to convert lateral displacement motions of the vibrating flow tube, which tend to interfere with the measurements and/or have a disturbing effect on the connected pipe and which are superimposed on the tube's primary deformations, i.e., on the deformations to be measured, into oppositely directed deformations of the inlet-side and outlet-side tube sections that dynamically balance the transducer.

One advantage of the invention is that, on the one hand, the transducer is very well balanced despite possible operation-dependent variations of the internal mass distribution, and thus also independently of the density of the fluid, namely exclusively as a result of its internal geometry forced by means of cantilevers, whereby internal transverse impulses and transverse forces can be largely kept away from the connected pipe. On the other hand, the internal deformation forces necessary therefor essentially do not act beyond the transducer, particularly not on the pipe.

The transducer according to the invention is further characterized by the fact that because of the dynamic vibration isolation, it can be made very compact and very light. It turned out that such a transducer can have more than 25% less mass than, for example, a transducer whose internal transverse forces are counterbalanced to a comparable extent by means of the above-mentioned mechanical low-pass filter system. Therefore, the transducer is particularly suited for measurements in pipes of great nominal diameter, e.g., greater than 80 mm.

BRIEF DESCRIPTION OF THE DRAWINGS

The invention and further advantages will become more apparent by reference to the following description of an embodiment taken in conjunction with the accompanying drawings. Like reference characters have been used to designate like parts throughout the various figures; reference characters that were already assigned are not repeated in subsequent figures if this contributes to clarity. In the drawings.

DETAILED DESCRIPTION OF EXEMPLARY EMBODIMENTS

Figure 1:
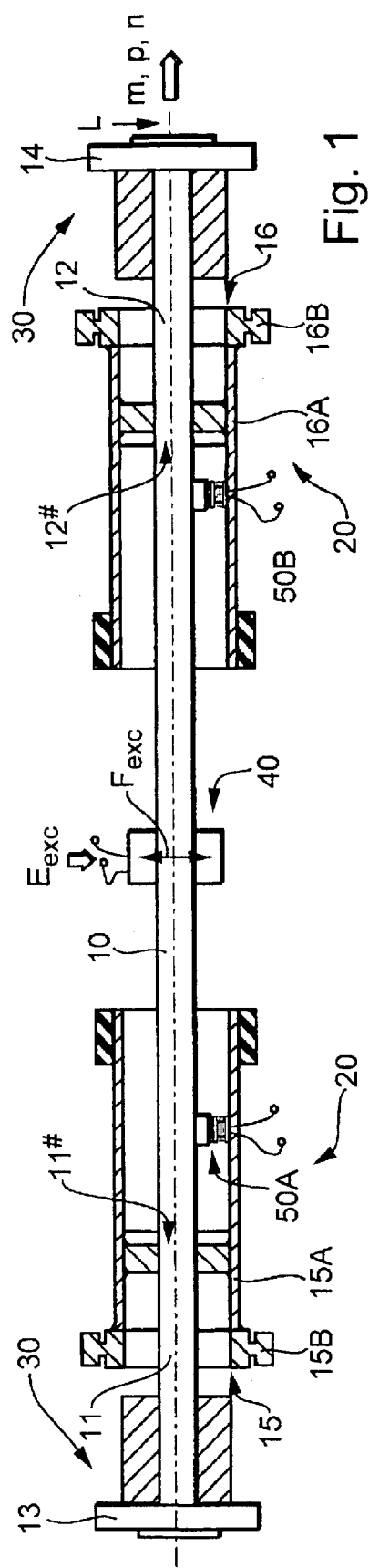
FIG. 1 is a partially sectioned side view of a Coriolis-type transducer with one flow tube.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Figure 2:
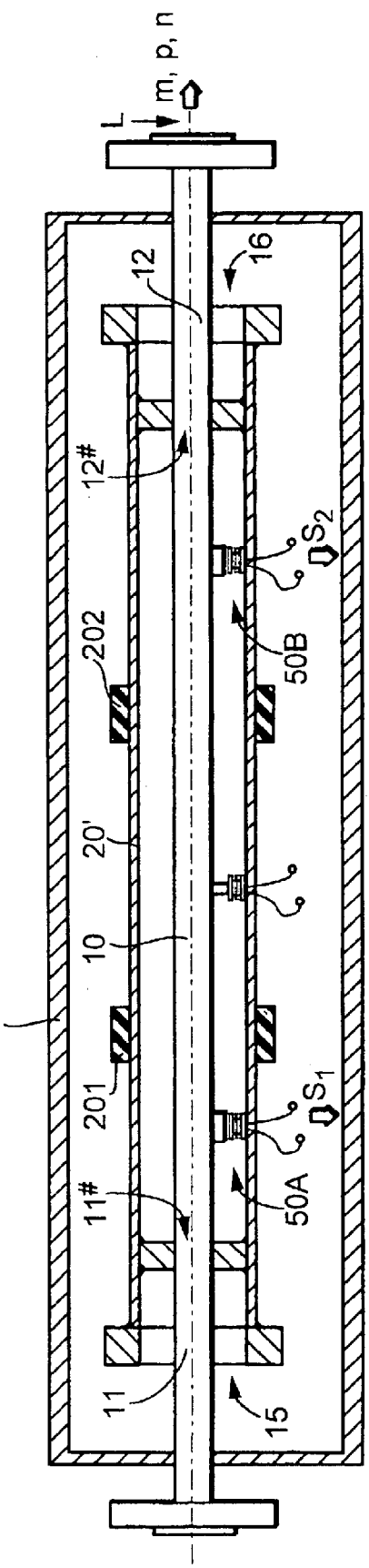
FIG. 2 is a partially sectioned side view of a development of the transducer of FIG. 1.

FIGS. 1 and 2 show a vibratory transducer in schematic side views. The transducer serves to produce in a fluid passing therethrough mechanical reaction forces, such as mass-flow-rate-dependent Coriolis forces, density-dependent inertial forces, and/or viscosity-dependent friction forces, which react on the transducer and are measurable, particularly with sensor technology. From these reaction forces, a mass flow rate m, a density $\rho$, and/or a viscosity $\eta$ of the fluid, for example, can thus be derived in the manner familiar to those skilled in the art.

To conduct the fluid, the transducer comprises a substantially straight flow tube 10, particularly a single tube, which in operation, oscillating about a static rest position, is repeatedly elastically deformed.

To this end, flow tube 10 is mounted in a first support system 20 so as to be capable of vibratory motion, the support system 20 being fixed to flow tube 10 at the inlet and outlet ends. For the support system 20, a supporting frame or a supporting tube can be used, for example. Further preferred embodiments of support system 20 are explained below.

To permit flow of fluid through flow tube 10, the latter is connected to a fluid-conducting pipe via an inlet-side tube section 11 and an outlet-side tube section 12. Flow tube 10, inlet-side tube section 11, and outlet-side tube section 12 are aligned with each other and with an imaginary longitudinal axis L and are advantageously of one-piece construction, so that they can be fabricated from a single tubular semifinished product, for example; if necessary, however, flow tube 10 and tube sections 11, 12 can also be made from separate semifinished products that are subsequently joined together, for instance welded together. For flow tube 10, virtually any of the materials commonly used for such transducers, such as steel, titanium, zirconium, etc, can be used.

If the transducer is to be detachable from the pipe, a first flange 13 and a second flange 14 are preferably formed on inlet-tube section 11 and outlet-side tube section 12, respectively; if necessary, inlet- and outlet-side tube sections 11, 12 may also be connected with the pipe directly, for instance by welding or brazing.

Furthermore, as shown schematically in FIG. 1, a second support system 30 may be fixed to inlet- and outlet-side tube sections 11, 12; preferably, this second support system may be implemented as a transducer case 30' that houses the flow tube 10, see FIG. 1.

In operation, flow tube 10 is excited into flexural vibrations, particularly in the range of a natural resonance frequency, such that in this so-called useful mode, it deflects essentially according to a first form of natural vibrations.

In a preferred embodiment of the invention, flow tube 10 is excited at a vibration frequency that corresponds as exactly as possible to a natural resonance frequency of the so-called f1 eigenmode of flow tube 10, i.e., to a symmetrical eigenmode, in which, as shown schematically in FIG. 3, the vibrating, but empty flow tube 10 has a single antinode. For example, in the case of a flow tube 10 of special steel with a nominal diameter of 20 mm, a wall thickness of about 1.2 mm, and a length of about 350 mm, the resonance frequency of the f1 eigenmode is approximately 850 to 900 Hz.

When fluid flows through the pipe, so that the mass flow rate m is nonzero, Coriolis forces are induced in the fluid by the flow tube 10 vibrating in the manner described above. The Coriolis forces react on flow tube 10, thus causing an additional deformation (not shown) of flow tube 10 according to a second form of natural vibrations, which is superimposed on the excited useful mode as a coplanar mode. This deformation can be detected using sensor technology. The instantaneous shape of the deformation of flow tube 10, particularly in terms of its amplitudes, is also dependent on the instantaneous mass flow rate m. The second form of natural vibrations, the so-called Coriolis mode, can be, for instance, the antisymmetric f2 eigenmode, i.e., the mode with two antinodes, and/or the antisymmetric f4 eigenmode with four antinodes, as is usually the case in such transducers.

When the useful mode is excited, transverse forces $Q_1$ are produced in the vibrating single flow tube 10 by mass accelerations associated with the flexural vibrations, as is well known; thus, corresponding laterally directed transverse impulses occur in the transducer. At a vibration amplitude of approx. 0.03 mm, for example, a transverse force of about 100 N would result for the above-mentioned flow tube of special steel.

If these transverse forces $Q_1$ are not counterbalanced, a transverse impulse remains in the transducer. As a result, the flow tube 10, mounted via inlet-side tube section 11 and outlet-side tube section 12, together with the first support system 20 fixed thereto, will be laterally deflected from the assigned static rest position. Accordingly, the transverse forces $Q_1$ would at least partly act via inlet-side and outlet-side tube sections 11, 12 on the connected pipe and thus cause the latter to vibrate as well.

To minimize such oscillating transverse forces $Q_1$ acting on the pipe, in a preferred embodiment of the invention, the first support system 20 is implemented as an antivibrator 20' which vibrates out of phase with, particularly opposite in phase to, flow tube 10, and which therefore is preferably flexible.

Figure 3A:
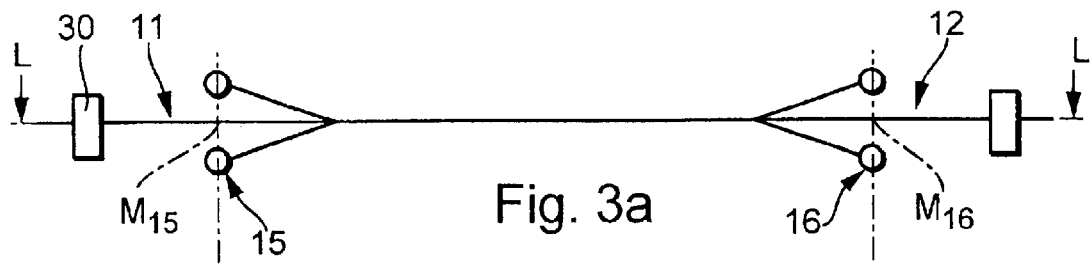
FIGS. 3a to 3d show schematically deflection lines of the flow tube during operation of the transducer of FIG. 1 or 2.
Figure 3B:
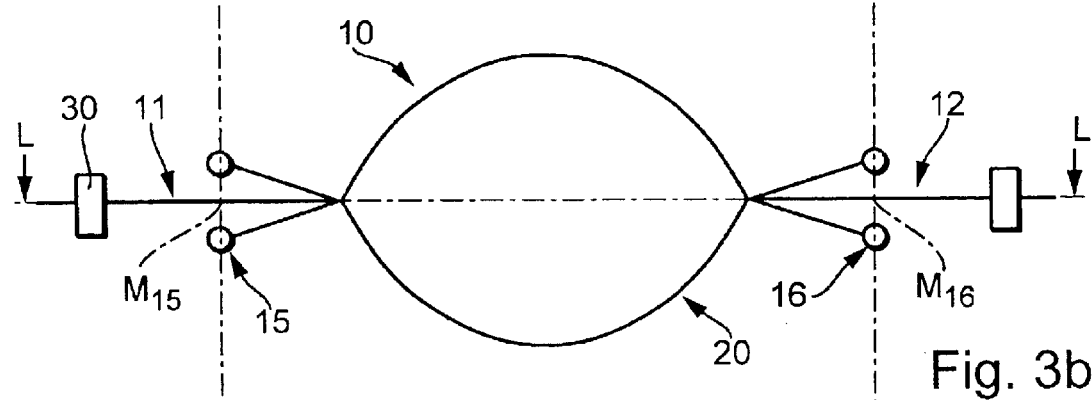
Figure 3C:
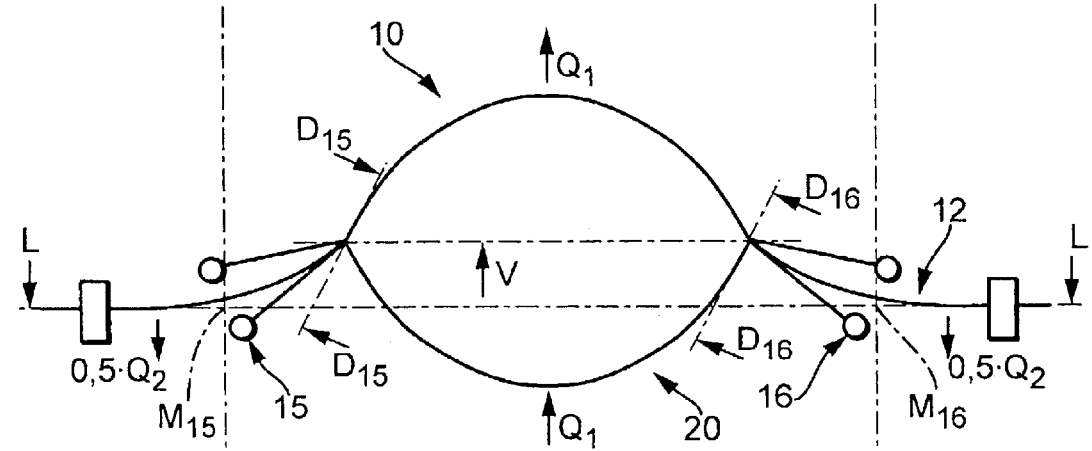

Antivibrator 20' serves to dynamically balance the transducer for a predetermined fluid density value, for instance a value most frequently expected during operation of the transducer or a critical value, to the point that the transverse forces $Q_1$ produced in the vibrating flow tube 10 are compensated as completely as possible and that flow tube 10 then practically does not leave its static rest position, cf. FIGS. 3a, 3b. Accordingly, in operation, antivibrator 20', as shown schematically in FIG. 3b, is also excited into flexural vibrations that are essentially coplanar with the flexural vibrations of flow tube 10.

To this end, antivibrator 20', as shown in FIG. 1, is preferably implemented in the form of a tube, particularly a tube that is coaxial with flow tube 10. If necessary, antivibrator 20', as also shown in U.S. Pat. No. 5,969,265, EP-A 317,340, or WO-A 00/14485, for example, can also be implemented as a multipart, composite unit or by means of two separate antivibrators fixed to flow tube 10 at the inlet end and outlet end, respectively, cf. FIG. 2. Particularly in the latter case, where the inner support system 20 is formed by means of an inlet-side antivibrator and an outlet-side antivibrator, the outer support system 30 can also be implemented as a two-part system consisting of an inlet-side subsystem and an outlet-side subsystem, cf. FIG. 2.

To permit easy tuning of antivibrator 20' to the aforementioned density value and the actually excited vibration mode of flow tube 10, in another preferred embodiment of the invention, discrete first and second mass pieces 201, 202 are mounted, preferably detachably, on antivibrator 20'. Mass pieces 201, 202 may be, for example, disks screwed onto staybolts provided on flow tube 10, or short tube sections slipped over the flow tube. Furthermore, a corresponding mass distribution over antivibrator 20' can be realized by forming longitudinal or annular grooves, for example. A mass distribution suitable for the respective application can be easily determined by the person skilled in the art using the finite element method and/or suitable calibration measurements, for example. If necessary, more than two mass pieces 201, 202 can be used, of course. At this point it should be noted that both support systems 20, 30, but at least the antivibrator 20' and the transducer case 30', can be retrofitted on an existing pipe, as proposed in WO-A 99/51946 or EP-A 1 150 104, for example.

To generate mechanical vibrations of flow tube 10, the transducer further comprises an excitation system 40, particularly an electrodynamic system. The excitation system serves to convert electric excitation energy $E_{exc}$ supplied from control electronics (not shown), for instance with a regulated current and/or a regulated voltage, into an excitation force $F_{exc}$ that acts on flow tube 10, for example in a pulsed manner or harmonically, and elastically deforms the tube in the manner described above. The excitation force $F_{exc}$ may be bidirectional as shown schematically in FIG. 1, or unidirectional, and can be adjusted in amplitude, for instance by means of a current- and/or voltage-regulator circuit, and in frequency, for instance by means of a phase-locked loop, in the manner familiar to those skilled in the art. The excitation system can be, for example, a simple solenoid with a cylindrical excitation coil that is mounted on antivibrator 20' and traversed in operation by a suitable excitation current, and with a permanent magnetic armature that is fixed to the outside of flow tube 10, particularly at the midpoint thereof, and rides in the excitation coil at least in part. Excitation system 40 can also be implemented as an electromagnet or, as shown in WO-A 99/51946, as a seismic exciter, for example.

To detect vibrations of flow tube 10, a sensor system as is commonly used for such transducers can be employed, in which the motions of flow tube 10 are sensed with an inlet-side first sensor 50A and an outlet-side second sensor 50B and converted into corresponding first and second sensor signals $S_1$ and $S_2$, respectively, in the manner familiar to those skilled in the art. Sensors 50A, 50B can be electrodynamic velocity sensors as shown schematically in FIG. 1, which perform relative vibration measurements, or electrodynamic displacement sensors or acceleration sensors, for example. In place of electrodynamic sensor systems, sensor systems using resistive or piezoelectric strain gages or optoelectronic sensor systems can be employed.

Figure 3D:
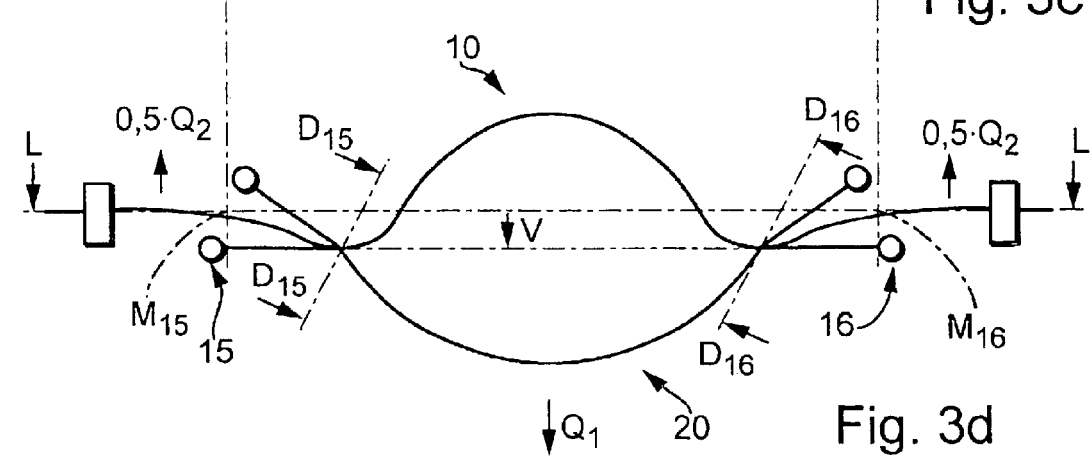

As repeatedly mentioned, flow tube 10 can also be dynamically balanced by means of antivibrator 200 for only a single fluid density value, but for a very narrow fluid density range at best, cf. FIG. 3b. During variations in density ρ, however, flow tube 10 will be laterally displaced from its rest position, symbolized in FIGS. 3a to 3d by the longitudinal axis L, namely at high densities ρ above the aforementioned fluid-density value in the direction of its own vibratory motion, as shown schematically in FIG. 3c, and at low densities ρ below that fluid-density value in the direction of the vibratory motion of the inner support system 20, which may be implemented as antivibrator 20', as shown in FIG. 3d.

To improve the dynamic balance of the transducer, particularly for fluids with significantly varying density ρ, the transducer further comprises a first cantilever 15, fixed as rigidly as possible to inlet-side tube section 11, and a second cantilever 16, fixed as rigidly as possible to outlet-side tube section 12 and preferably identical in shape to cantilever 15.

According to the invention, the two cantilevers 15 and 16, which are preferably disposed symmetrically with respect to the midline of flow tube 10, serve to dynamically produce bending moments in inlet-side tube section 11 and outlet-side tube section 12, respectively, particularly near the adjoining flow tube 10, when the vibrating flow tube 10, together with antivibrator 20' if present, is laterally displaced from its static rest position. To this end, cantilever 15 and cantilever 16 are positively and/or nonpositively connected, for instance welded or clamped on, to an outlet end $11^\#$ of inlet-tube section 11 and an inlet end $12^\#$ of outlet-tube section 12, respectively.

As shown schematically in FIGS. 1 and 2, the two cantilevers 15, 16 are so positioned in the transducer, preferably as close as possible to flow tube 10, that a centroid $M_{15}$ of cantilever 15 and a centroid $M_{16}$ of cantilever 16 are spaced from, and particularly located in line with, flow tube 10. In this manner, moments of inertia are developed by means of cantilevers 15, 16 which are applied at the respective fixing points, namely outlet at end $11^\#$ and inlet end $12^\#$, eccentrically, i.e., not at the associated centroids $M_{15}$, $M_{16}$. These moments of inertia, in turn, cause cantilevers 15, 16 to oscillate about their respective, nearly stationary centroids $M_{15}$, $M_{16}$, thus forcing additional twisting of outlet end $11^\#$ about an imaginary first axis of rotation $D_{15}$, which is perpendicular to the lateral displacement motion V of flow tube 10 and to the longitudinal axis L, and of inlet end $12^\#$ about an imaginary second axis of rotation $D_{16}$, which is essentially parallel to the first, see FIGS. 3c and 3d.

Figure 4:
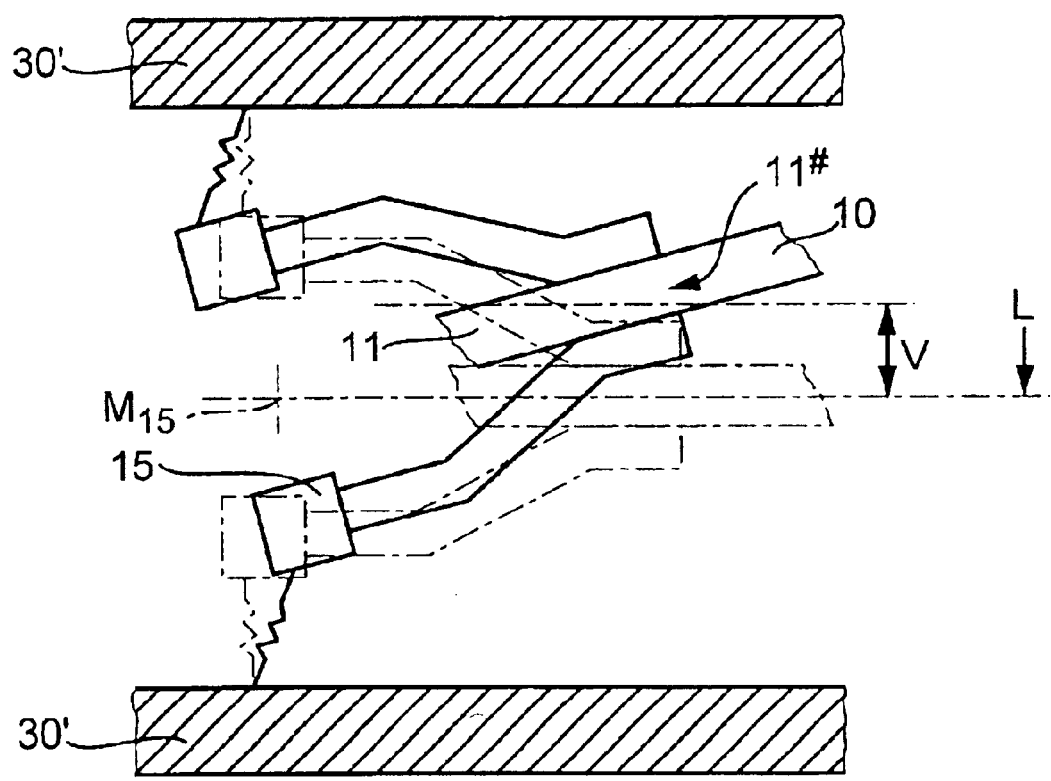
FIG. 4 shows schematically a portion of the flow tube during operation of the transducer of FIG. 1 or 2.

This twisting of outlet end $11^\#$, which is shown enlarged in FIG. 4, causes additional bending of at least parts of inlet-side tube section 11 which is directed opposite to the displacement motion V of flow tube 10 and which corresponds to a uniaxial, transverse-force-free and, thus, shear-stress-free bending; analogously, outlet-tube section 12 is bent in opposite direction to the displacement motion V.

According to findings of the inventors, this bending of inlet-side and outlet-side tube sections 11, 12 can be optimized, for instance by means of computer-assisted simulation calculations or by means of experimental measurements, such that the above-mentioned transverse forces $Q_1$ in the vibrating flow tube 10 are completely or at least partially balanced by counterforces $Q_2$ produced by the bending, such that practically no transverse forces caused by the vibrating flow tube 10 and the possibly likewise vibrating internal support system 20 will act on the connected pipe. Any deformations of the connected pipe caused by the resulting bending moments can be easily suppressed by support system 30, for instance by a suitably high flexural rigidity of the above-mentioned transducer case 30'.

The invention is also predicated in the surprising recognition that through a suitable deformation of inlet-side tube section 11 and outlet-side tube section 12 independently of instantaneous vibration amplitudes and/or frequencies of flow tube 10 in the above-mentioned useful mode, i.e., through a suitable shape of a corresponding deflection line, a force value and a momentum value per unit length along the longitudinal axis L can be set within the transducer in such a way that transverse impulses directed opposite to the transverse impulses produced in the vibrating flow tube 10 can be produced such that the transverse impulses neutralize each other, so that the transverse forces $Q_1$ produced by the vibrating flow tube 10 can be essentially balanced by means of transverse forces $Q_2$ produced by the deforming inlet-side tube section 11 and the deforming outlet-side tube section 12.

In a further preferred embodiment of the invention, cantilever 15 is so shaped and attached to flow tube 10 that its centroid $M_{15}$ is located essentially in a range of one half the length of inlet-side tube section 11, and cantilever 16 is so shaped and attached to flow tube 10 that its centroid $M_{16}$ is located essentially in a range of one half the length of outlet-side tube section 12.

To develop the moments of inertia, cantilever 15, as shown in FIG. 1, has a cantilever arm 15A on which a cantilever mass 15B is formed remote from outlet end $11^\#$; similarly, cantilever 16 has a cantilever arm 16A with a cantilever mass 16B formed thereon remote from inlet end $12^\#$. Cantilever masses 15B and 16B are chosen so as to be capable of twisting in response to a lateral deflection of flow tube 10, and thus of inlet and outlet ends $11^\#$ and $12^\#$, respectively, but, in translatory terms, to remain essentially in the respective static rest positions assigned to them on the basis of the concrete mechanogeometrical parameters of cantilevers 15, 16. In a corresponding manner, the respective centroids $M_{15}$, $M_{16}$ of the two cantilevers 15, 16 remain essentially in their static rest positions although flow tube 10 is laterally displaced from its assigned static rest position; they thus serve as a center for the rotary motions of cantilevers 15, 16, which cause the above-mentioned bending moments.

Each of the two cantilevers 15, 16 is preferably clamped at one end, i.e., they are fixed only to outlet and inlet ends $11^\#$ and $12^\#$, respectively, as also shown in FIGS. 1 to 4. To suppress any unwanted vibration modes, however, additional spring and/or damping elements as shown schematically in FIG. 4 may be provided which, fixed to the respective cantilever mass 15B, 16B and to transducer case 30', stabilize the centroids $M_{15}$, $M_{16}$ of cantilevers 15, 16 in their respective rest positions.

Experiments on transducers with the above-mentioned flow tube of special steel have shown, for example, that each of the cantilever masses 15B, 16B, which should be as inert as possible to any lateral displacements, particularly in comparison with flow tube 10, should advantageously be chosen to be about five times as large as the mass of flow tube 10. Surprisingly, however, the two cantilever masses 15B, 16B and their cantilever arms 15A, 16A can be proportioned virtually independently of the vibration frequencies of the vibrating flow tube 10 which are expected in operation; it must only be ensured that cantilever masses 15B are made as heavy as possible, particularly heavier than flow tube 10, and that cantilever arms 15A, 16A, as indicated above, are made as rigid as possible.

To permit the cantilever masses to be twisted with as little resistance as possible, cantilevers 15 and 16 are preferably shaped and fixed to flow tube 10 in such a manner that a quotient of the aforementioned moment of inertia and the respective associated cantilever mass 15B, 16B is as low as possible. Investigations have shown that, if flow tube 10 is made of special steel as described above, for example, cantilevers 15 and 16 should be so shaped and fixed to inlet-side tube section 11 and outlet-side tube section, respectively, that the aforementioned quotient is less than $10^{-4}$ kg·m²/kg. The quotient can advantageously be set very accurately by implementing cantilever masses 15B and 16B in the form of elongate prisms or cylinders, symbolized in FIGS. 3a to 3d and 4 by their respective cross sections, and respectively attaching them via cantilever arms 15A and 16A to inlet-side and outlet-side tube sections 11 and 12 in such a way that respective principal axes of inertia for associated minimum principal moments of inertia of cantilever masses 15B and 16B are parallel to the aforementioned axes of rotation $D_{15}$, $D_{16}$.

The aforementioned quotient can also be minimized dynamically as a function of the lateral displacement motions V of flow tube 10. To accomplish this, in a further preferred embodiment of the invention, cantilever masses 15B, 16B are at least partially made pliable, for instance by forming grooves substantially parallel to the axes of rotation $D_{15}$, $D_{16}$, as shown schematically in FIG. 1.

Furthermore, cantilevers 15 and 16 are preferably designed so that their arms 15A and 16A have a higher flexural rigidity than, and preferably at least three times the flexural rigidity of, inlet-side and outlet-side tube sections 11 and 12, respectively. To this end, cantilever arms 15A, 16A may, for instance, be tubular in form, as already described for antivibrator 20'; then, they can be fixed to inlet-side and outlet-side tube sections 11 and 12, respectively, coaxially with flow tube 10 and in line with antivibrator 20', if the latter is present. In that case, cantilever arms 15A, 16A and antivibrator 20' can be made in one part from a single tubular semifinished product or in two parts from two tube halves, for example. The above-described ratio of flexural rigidities can also be set, for example, by selecting inlet-side and outlet-side tube sections 11, 12 of suitable length.

To the inventors' surprise, however, it turned out that the bending moments for inlet-side tube section 11 and outlet side tube section 12 can also be developed with sufficient accuracy by means of cantilever arms 15A, 16A that elastically deform significantly within certain limits. Cantilever masses 15B, 16B can then be designed to be subject to virtually no twisting, remaining in their assigned rest positions, preferably relatively far from flow tube 10. In the above-mentioned case where cantilever arms 15A, 16A are tubular, the arms may, for instance, be longitudinally slotted for setting both their flexural rigidity and the above-mentioned quotient.

As is readily apparent from the above explanations, the transducer according to the invention is characterized by a multitude of possible settings which enable the person skilled in the art, particularly after specification of external or internal mounting dimensions, to achieve high-quality balancing of transverse forces developed in flow tube 10 and in antivibrator 20', if present.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A vibratory transducer for a fluid flowing in a pipe, said transducer comprising:

a flow tube vibrating in operation, for conducting the fluid, said flow tube communicating with the pipe via an inlet-side tube section and an outlet side tube section, and said vibrating flow tube being, at least temporarily, laterally displaced from an assigned static rest position as a result of transverse impulses occurring in said vibratory transducer;

an excitation system for driving said flow tube;

a sensor system for sensing vibrations of said flow tube;

a first cantilever, fixed to an outlet end of the inlet-side tube section, for causing bending moments which elastically deform the inlet-side tube section; and a second cantilever, fixed to an inlet end of the outlet-side tube section, for causing bending moments which elastically deform the outlet-side tube section, said first cantilever having a centroid being located in the area of the inlet-side tube section and said second cantilever having a centroid being located in the area of the outlet-side tube section, and said bending moments being such that in the deforming inlet-side tube section and in the deforming outlet-side tube section impulses are produced which are directed opposite to the transverse impulses produced in the vibrating flow tube.

2. The vibratory transducer as claimed in claim 1, further comprising:

an antivibrator fixed to an inlet end and an outlet end of said flow tube.

3. The vibratory transducer as claimed in claim 1, further comprising a transducer case fixed to said inlet-side tube section and said outlet-side tube section.

4. A method for operating a vibratory transducer being connected to a fluid conducting pipe, said transducer comprising:

a flow tube for conducting the fluid flowing in said pipe, said flow tube communicating with the pipe via an inlet-side tube section and an outlet-side tube section, and said flow tube having an assigned static rest position in which said flow tube, said inlet-side tube section and said outlet-side tube section are essentially aligned with each other and with an imaginary longitudinal axis of the transducer, an excitation system for driving the flow tube;

a sensor system for sensing vibrations of the flow tube; and a first cantilever fixed to an outlet end of said inlet-side tube section and a second cantilever fixed to an inlet end of said outlet-side tube section, said first cantilever having a centroid being located in the area of the inlet-side tube section and said second cantilever having a centroid being located in the area of the outlet-side tube section, said method comprising the steps of:

passing the fluid through said flow tube;

vibrating said flow tube; and causing displacement motions of said vibrating flow tube, said displacement motions displacing the flow tube laterally from said assigned static rest position such that said outlet end of the inlet-side tube section and said inlet end of the outlet-side tube section being spaced apart from said imaginary longitudinal axis;

causing each of said first and second cantilevers to oscillate about its respective centroid for forcing twisting motions of said outlet end of the inlet-side tube section and said inlet end of the outlet-side tube section;

causing bending motions of at least parts of said inlet-side tube section and said outlet-side tube section, said bending motions are directed opposite to said displacement motions of said vibrating flow tube, and detecting vibrations of said flow tube.

5. The method as claimed in claim 4 wherein the vibratory transducer comprises an antivibrator fixed to an inlet end and an outlet end of the flow tube, and wherein the method further comprises the step of:

causing the antivibrator to oscillate out of phase with the flow tube.

6. The method as claimed in claim 4 wherein the vibratory transducer comprises an antivibrator fixed to an inlet end and an outlet end of the flow tube, and wherein the method further comprises the step of:

causing the antivibrator to vibrate in an opposite phase to the flow tube.

7. The method as claimed in claim 4 further comprises the step of:

driving the flow tube to vibrate with a vibration frequency lying in a range of natural resonance frequency.

8. The method as claimed in claim 7 further comprises the step of:

driving the flow tube to vibrate with a frequency corresponding with a natural resonance frequency of a symmetrical eigenmode of the flow tube.

\* \* \* \* \*